(12) United States Patent
Ohtani et al.

(10) Patent No.: US 11,859,075 B2
(45) Date of Patent: Jan. 2, 2024

(54) CORE-SHELL TYPE PARTICLE, DISPERSION AND POWDER

(71) Applicants: DAIKIN INDUSTRIES, LTD., Osaka (JP); NISSIN CHEMICAL INDUSTRY CO., LTD, Echizen (JP)

(72) Inventors: Katsuhide Ohtani, Osaka (JP); Masamichi Sukegawa, Osaka (JP); Kazuhiro Yamamura, Osaka (JP); Shoichi Arima, Echizen (JP); Takeshi Fukuzumi, Echizen (JP); Yuji Gama, Echizen (JP)

(73) Assignees: DAIKIN INDUSTRIES, LTD., Osaka (JP); NISSIN CHEMICAL INDUSTRY CO., LTD, Echizen (JP)

( * ) Notice: Subject to any disclaimer, the term of this patent is extended or adjusted under 35 U.S.C. 154(b) by 290 days.

(21) Appl. No.: 16/771,497

(22) PCT Filed: Dec. 13, 2018

(86) PCT No.: PCT/JP2018/045899
§ 371 (c)(1),
(2) Date: Jun. 10, 2020

(87) PCT Pub. No.: WO2019/124215
PCT Pub. Date: Jun. 27, 2019

(65) Prior Publication Data
US 2021/0070974 A1 Mar. 11, 2021

(30) Foreign Application Priority Data
Dec. 20, 2017 (JP) ................................ 2017-244349

(51) Int. Cl.
*C08F 259/08* (2006.01)
*C08L 27/18* (2006.01)

(52) U.S. Cl.
CPC ............ *C08L 27/18* (2013.01); *C08F 259/08* (2013.01); *C08L 2201/50* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 5,679,741 A * | 10/1997 | Breton | ..................... | C08L 25/06 525/71 |
| 5,804,654 A | 9/1998 | Lo et al. | | |
| 2008/0275188 A1* | 11/2008 | Park | ..................... | C08F 114/26 525/199 |
| 2011/0040039 A1* | 2/2011 | Palamone | ............. | C08F 259/08 428/407 |
| 2012/0302702 A1* | 11/2012 | Kwampian | ............. | C08J 3/126 525/199 |
| 2014/0221556 A1 | 8/2014 | Yoshida et al. | | |
| 2020/0010694 A1 | 1/2020 | Kakiuchi et al. | | |

FOREIGN PATENT DOCUMENTS

| | | |
|---|---|---|
| CN | 107254022 A | 10/2017 |
| JP | 63-312836 A | 12/1988 |
| JP | 06-056942 A | 3/1994 |
| JP | 09-095583 A | 4/1997 |
| JP | 11-246611 A | 9/1999 |
| JP | 2003-246937 A | 9/2003 |
| JP | 2003-327708 A | 11/2003 |
| JP | 2007-106953 A | 4/2007 |
| JP | 2011-252054 A | 12/2011 |
| JP | 2012-082414 A | 4/2012 |
| JP | 2012-092316 A | 5/2012 |
| JP | 2013-071989 A | 4/2013 |
| JP | 2013-082897 A | 5/2013 |
| JP | 2015-058418 A | 3/2015 |
| JP | 2015-199943 A | 11/2015 |
| JP | 2015-199944 A | 11/2015 |
| JP | 2017-179321 A | 10/2017 |
| JP | 2017-179322 A | 10/2017 |
| JP | 2017-218520 A | 12/2017 |
| WO | 2018/181740 A1 | 10/2018 |

OTHER PUBLICATIONS

Dupont Teflon PTFE properties handbook; (1996) pp. 1-35. (Year: 1996).*
Huang, A Novel Method to Prepare Hydrophobic Poly(tetraflouroethylene) Membrane, and its Properties; Journal of Material Science (2010) 45 pp. 6569-6573. (Year: 2010).*
ChemBk entry for styrene-acrylonitrile copolymer (2015) pp. 1-6. (Year: 2015).*
International Preliminary Report on Patentability with translation of Written Opinion dated Jun. 23, 2020 in International Application No. PCT/JP2018/045899.
Extended European Search Report for counterpart EP Appln. No. 18892653.9 dated Jul. 14, 2021.
International Search Report for PCT/JP2018/045899, dated Mar. 12, 2019.

* cited by examiner

*Primary Examiner* — David J Buttner
(74) *Attorney, Agent, or Firm* — Sughrue Mion, PLLC

(57) ABSTRACT

A core-shell particle including a core containing a perfluoropolymer and a shell containing a non-fluorine resin, the core having a periphery coated with the non-fluorine resin at a coverage of 90% or more, the perfluoropolymer being a polymer containing a polymerized unit based on a perfluoro monomer in an amount of 90 mol % or more relative to all polymerized units, and the shell having a mass of 50 or less relative to a total mass of the core and the shell of 80. Also disclosed is a method for producing the core-shell particle.

5 Claims, 2 Drawing Sheets

CORE-SHELL TYPE PARTICLE, DISPERSION AND POWDER

CROSS REFERENCE TO RELATED APPLICATIONS

This application is a National Stage of International Application No. PCT/JP2018/045899 filed Dec. 13, 2018, claiming priority based on Japanese Patent Application No. 2017-244349 filed Dec. 20, 2017.

TECHNICAL FIELD

The invention relates to core-shell particles, dispersions, and powders.

BACKGROUND ART

Perfluoropolymers typified by polytetrafluoroethylene (PTFE) have excellent properties and are thus used in versatile fields including coating for devices such as chemical plants and semiconductor manufacturing devices; coating of electric wires and optical fibers; and automobile members. In applications where perfluoropolymers are used with a different material, improved dispersibility in the material is required.

In order to achieve no self-adhesiveness and improved free fluidity, Patent Literature 1 discloses a polymer blend, characterized in that it includes polymerizate particles including groups of tetrafluoroethylene (TFE) derivatives totally or partially encapsulated by a polymer or copolymer obtained by polymerization of monomers or mixtures of monomers which can be emulsion-polymerized, the polymer blend being substantially free of TFE polymerizate filaments forming a network connecting the particles of the blend.

Patent Literature 2 discloses a dripping inhibitor for a polymer composition, containing a polymer blend in a form of free-flowing particles, the particles containing a tetrafluoroethylene polymer at least partially encapsulated by a polymer or copolymer such as a styrene-acrylonitrile copolymer, wherein the encapsulating polymer or copolymer is obtained by emulsion polymerization of one or more monomers in the presence of a tetrafluoroethylene polymer latex, and the polymer blend is substantially free of tetrafluoroethylene polymerizate filaments forming a network connecting the particles of the blend.

Patent Literature 3 discloses a method for producing a PTFE-containing mixed powder containing PTFE (A) and an organic polymer (B), including a step of preparing the organic polymer (B) by emulsion polymerization using as an emulsifier at least one selected from the group consisting of dipotassium alkenyl succinate, sodium 1,4-dicyclohexylsulfonate, sodium dioctyl sulfosuccinate, and sodium laurate.

Patent Literature 4 discloses a drip inhibiting powder containing 30 to 85% by mass of PTFE (A) having a number average molecular weight of 1,000,000 to 5,000,000 and 15 to 70% by mass of a vinyl-based polymer (B).

CITATION LIST

Patent Literature

Patent Literature 1: JP H09-95583 A
Patent Literature 2: JP 2003-246937 A
Patent Literature 3: JP 2003-327708 A
Patent Literature 4: JP 2007-106953 A

SUMMARY OF INVENTION

Technical Problem

The invention aims to provide a core-shell particle having excellent dispersibility. The invention also aims to provide a powder having excellent dispersibility and dispersion allowing excellent dispersibility.

Solution to Problem

The inventors conducted intensive studies on particles having excellent dispersibility to find that particles including cores and shells formed from specific resins and having a specific average particle size have excellent dispersibility, completing the invention.

The invention relates to a core-shell particle including a core containing a perfluoropolymer and a shell containing a non-fluorine resin, the core having a periphery coated with the non-fluorine resin at a coverage of 90% or more.

The perfluoropolymer is preferably polytetrafluoroethylene, a tetrafluoroethylene/perfluoro(alkyl vinyl ether) copolymer, or a tetrafluoroethylene/hexafluoropropylene copolymer.

The polytetrafluoroethylene preferably has a standard specific gravity of 2.13 to 2.30.

The non-fluorine resin is preferably a polymer containing a polymerized unit based on a non-fluorine monomer, and the non-fluorine monomer preferably includes at least one selected from the group consisting of an acrylic ester, a methacrylic ester, acrylonitrile, vinyl chloride, vinylidene chloride, vinyl acetate, a styrene monomer, a urethane monomer, and a silicone monomer.

The core and the shell preferably give a mass ratio (core/shell) of 99.9/0.1 to 10/90.

The invention also relates to a dispersion containing the core-shell particle.

The invention also relates to a powder containing the core-shell particle.

The invention further relates to a method for producing a core-shell particle, including adding a non-fluorine monomer to a perfluoropolymer dispersion and polymerizing the non-fluorine monomer to produce the core-shell particle, the polymerization being initiated by simultaneously adding the non-fluorine monomer and a polymerization initiator to the perfluoropolymer dispersion.

Advantageous Effects of Invention

The core-shell particle of the invention (hereinafter, also simply referred to as a "particle of the invention") has the above structure and thus has excellent dispersibility. The dispersion of the invention contains the particles and thus allows excellent dispersibility. The powder of the invention contains the particles and thus has excellent dispersibility.

Figure 3:
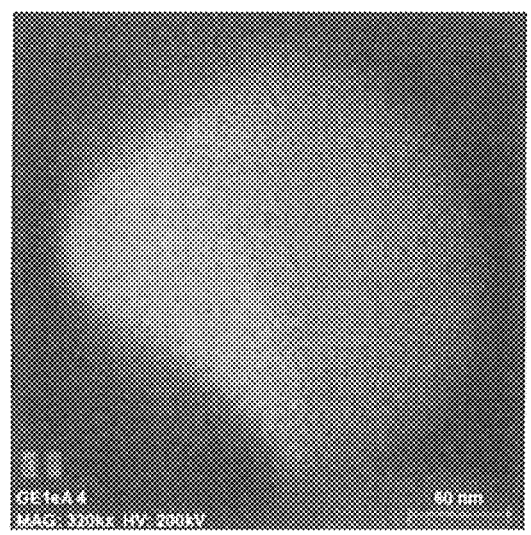

FIG. 3 is an image in which an image of a core-shell particle in a dispersion obtained in Comparative Example 3 taken with a scanning transmission electron microscope is superimposed with element mapping images of carbon and fluorine.

DESCRIPTION OF EMBODIMENTS

The invention is specifically described below.

The particle of the invention relates to a core-shell particle including a core containing a perfluoropolymer and a shell containing a non-fluorine resin, the core having a periphery coated with the non-fluorine resin at a coverage of 90% or more.

The particle of the invention has a core-shell, structure including a core containing a perfluoropolymer and a shell containing a non-fluorine resin. The "core-shell structure" is a conventionally known structure and is the structure of a primary particle in an aqueous dispersion producible by the method disclosed in U.S. Pat. No. 6,841,594 B, for example.

In conventional core-shell particles including a core containing a perfluoropolymer and a shell containing a non-fluorine resin, the core is unfortunately insufficiently coated with the shell.

The particle of the invention, including a core coated with a non-fluorine resin at a coverage of 90% or more, shows very good dispersibility and thus can be suitably used in various applications.

The coverage can be calculated as follows. First, element mapping images of carbon and fluorine for a target particle are prepared with a transmission electron microscope. The element mapping images of carbon and fluorine are superimposed with each other. Using image analyzing software, the superimposed images are binarized and separated into a core particle portion containing fluorine and a carbon portion circumferentially present on the periphery of the core particle portion. Then, the length of the periphery of the core particle portion containing fluorine is determined by selecting 50 or more points and measuring the lengths therebetween by section length measurement in a manual manner. The coverage Z (%) can be calculated by the following formula:

$$Z=(Y/(X+Y))\times 100$$

wherein X represents the length (nm) of a part where the inner periphery of the particle containing fluorine and the outer periphery of the particle containing carbon are not superimposed (a part where the core particle is not coated with the shell) and Y represents the length (nm) of a part where the periphery of the particle containing fluorine and the periphery of the particle containing carbon are superimposed with each other (a part where the core particle is coated with the shell).

A specific method for calculating the coverage is described in the examples below.

The particle of the invention has the aforementioned core-shell structure and thus has excellent dispersibility. Such a core-shell structure can also improve the dispersibility of a dispersion containing the particles of the invention (primary particles) and a powder (secondary particles) formed from the particles of the invention.

Furthermore, the presence of the core containing a perfluoropolymer enables the powder or dispersion formed from the particles of the invention to have excellent slidability, excellent non-stickiness, and low dielectricity when the dispersion or powder is used with a different material.

The coverage of the core coated with a non-fluorine resin in the particle of the invention is preferably 95% or more. More preferably, the core is completely coated with the shell (coverage: 100%).

An example of the particle of the invention is an emulsion particle prepared through emulsion polymerization of a monomer composition that constitutes a core part (a monomer composition containing a monomer such as tetrafluoroethylene, perfluoro(alkyl vinyl ether), or hexafluoropropylene) and a monomer composition that constitutes a shell part (a monomer composition used for producing the non-fluorine resin).

The "perfluoropolymer" as used herein means a polymer mainly containing a polymerized unit based on a perfluoro monomer, optionally containing a polymerized unit based on a monomer other than the perfluoro monomer. The polymerized unit based on a perfluoro monomer is preferably present in an amount of 90 mol % or more relative to all the polymerized units, for example.

The perfluoropolymer is preferably polytetrafluoroethylene (PTFE), a tetrafluoroethylene (TFE)/perfluoro(alkyl vinyl ether) (PAVE) copolymer (PFA), or a TFE/hexafluoropropylene (HFP) copolymer (FEP).

The PTFE may be melt-fabricable PTFE having a low molecular weight or non-melt-fabricable PTFE.

When the particle is used for a dripping inhibitor, for example, the PTFE is preferably non-melt-fabricable PTFE. Non-melt-fabricable PTFE allows the particle of the invention to more significantly exhibit its dispersibility.

The PTFE may be a tetrafluoroethylene (TFE) homopolymer or a copolymer of a TFE unit based on TFE and a modifying monomer unit based on a monomer other than TFE (hereinafter, also referred to as a "modifying monomer").

The modified PTFE preferably contains the modifying monomer unit in an amount of 0.001 to 1.0% by mass, more preferably 0.01 to 0.50% by mass, still more preferably 0.02 to 0.30% by mass, of all the monomer units.

The modifying monomer may be any modifying monomer copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); fluoro alkyl vinyl ether; fluoroalkyl ethylene; ethylene; and fluorine-containing vinyl ethers containing a nitrile group. One or more of these modifying monomers may be used.

An example of the fluoroalkyl vinyl ether is, but not limited to, a fluoromonomer represented by the following formula (1):

$$CF_2=CF-ORf^1 \qquad (1)$$

(wherein $Rf^1$ is a perfluoro organic group). The "perfluoro organic group" as used herein means an organic group in which hydrogen atoms binding to any carbon atom are all substituted with fluorine atoms. The perfluoro organic group optionally contains ether oxygen.

An example of the fluoroalkyl vinyl ether is a fluoromonomer represented by the formula (1) wherein $Rf^1$ is a C1-C10 perfluoroalkyl group. The perfluoroalkyl group preferably has a carbon number of 1 to 5.

Examples of the perfluoroalkyl group in the fluoroalkyl vinyl ether include a perfluoromethyl group, a perfluoroethyl group, a perfluoropropyl group, a perfluorobutyl group, a perfluoropentyl group, and a perfluorohexyl group. Preferred is perfluoro(propyl vinyl ether) (PPVE) in which the perfluoroalkyl group is a perfluoropropyl group.

Examples of the fluoroalkyl vinyl ether further include a fluoroalkyl vinyl ether represented by the formula (1) wherein $Rf^1$ is a C4-C9 perfluoro(alkoxy alkyl) group; a fluoroalkyl vinyl ether represented by the formula (1) wherein $Rf^1$ is a group represented by the following formula:

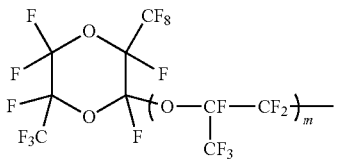
[Chem. 1]

(wherein m is an integer of 0 or 1 to 4); and a fluoroalkyl vinyl ether represented by the formula (1) wherein $Rf^1$ is a group represented by the following formula:

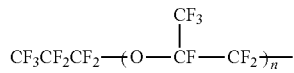
[Chem. 2]

(wherein n is an integer of 1 to 4).

A preferred example of the fluoroalkyl ethylene is, but not limited to, (perfluoroalkyl)ethylene. Examples thereof include (perfluorobutyl)ethylene (PFBE) and (perfluorohexyl)ethylene.

The PTFE preferably has a standard specific gravity (SSG) of 2.13 to 2.30, more preferably 2.14 to 2.29, still more preferably 2.15 to 2.28.

SSG refers to a value obtained by a method in conformity with ASTM D-4895-89.

The "high molecular weight PTFE" as used herein means a PTFE having a standard specific gravity that falls within the above range.

The PTFE preferably has a melt viscosity at 380° C. of $1\times10^2$ to $7\times10^5$ Pa·s. The "low molecular weight PTFE" as used herein means a PTFE having a melt viscosity that falls within the above range.

The melt viscosity can be measured in conformity with ASTM D 1238. Specifically, the melt viscosity of a 2-g sample previously heated at a measurement temperature (380° C.) for five minutes is measured at the temperature and a load of 0.7 MPa using a flow tester and a 2φ-8 L die.

The PFA is a copolymer containing a TFE unit and a PAVE unit.

Examples of the PAVE constituting the PFA include at least one selected from the group consisting of a PAVE represented by the formula (1):

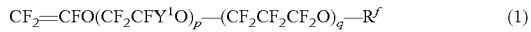
(1)

(wherein $Y^1$ is F or $CF_3$; $R^f$ is a C1-C5 perfluoroalkyl group; p is an integer of 0 to 5; and q is an integer of 0 to 5); and a PAVE represented by the formula (2):

(2)

(wherein Xs are the same as or different from each other and are each F or $CF_3$; and $R^1$ is a linear or branched C1-C6 perfluoroalkyl group or a C5 or C6 cyclic perfluoroalkyl group).

Specific examples thereof include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE).

The PAVE is preferably a PAVE having a bulky side chain, specifically preferably PPVE.

The PFA preferably contains a polymerized unit based on PAVE in an amount of 1.0 to 10% by mass relative to all the polymerized units.

The amount of the polymerized unit based on PAVE is more preferably 2.0% by mass or more, still more preferably 3.5% by mass or more, particularly preferably 4.0% by mass or more, while more preferably 8.0% by mass or less, still more preferably 7.0% by mass or less, particularly preferably 6.5% by mass or less, relative to all the polymerized units. The amount of the polymerized unit based on PAVE is measured by $^{19}$F-NMR.

The PFA preferably contains the polymerized unit based on TFE and the polymerized unit based on PAVE in a total amount of 90 mol % or more, more preferably 95 mol % or more, relative to all the polymerized units. The PFA also preferably consists only of the polymerized unit based on TFE and the polymerized unit based on PAVE.

The PFA preferably has a melting point of 280° C. to 322° C.

The melting point is more preferably 290° C. or higher, while more preferably 315° C. or lower.

The melting point is the temperature corresponding to the maximum value on a heat-of-fusion curve drawn using a differential scanning calorimeter (DSC) at a temperature-increasing rate of 10° C./min.

The PFA can be produced by a conventionally known method, such as a method including mixing monomers to constitute the units of the PFA and an additive such as a polymerization initiator as appropriate and performing emulsion polymerization or suspension polymerization.

The FEP includes a TFE unit and a HFP unit.

The FEP preferably gives a mass ratio between the TFE unit and the HFP unit (TFE/HFP) of (70 to 99)1(1 to 30) (% by mass), more preferably (85 to 95)/(5 to 15) (% by mass).

The FEP also preferably contains a PAVE unit in addition to the TFE unit and the HFP unit, namely, is preferably a TFE/HFP/PAVE copolymer. Examples of the PAVE unit contained in the FEP include the same as those described for the PAVE unit constituting PFA. More preferred among those is PPVE.

The FEP preferably contains the polymerized unit based on TFE, the polymerized unit based on HFP, and the polymerized unit based on PAVE in a total amount of 90 mol % or more, more preferably 95 mol % or more, relative to all the polymerized units. The FEP may consist only of the polymerized unit based on TFE and the polymerized unit based on HFP or of the polymerized unit based on TFE, the polymerized unit based on HFP, and the polymerized unit based on PAVE.

In the case of a TFE/HFP/PAVE copolymer, the FEP preferably has a mass ratio (TFE/HFP/PAVE) of (70 to 99.8)/(0.1 to 25)/(0.1 to 25) (% by mass). A mass ratio within the above range can lead to better heat resistance.

The mass ratio (TFE/HFP/PAVE) is more preferably (75 to 98)/(1.0 to 15)1(1.0 to 10) (% by mass).

The TFE/HFP/PAVE copolymer contains the HFP unit and the PAVE unit in a total amount of 1% by mass or more.

The TFE/HFP/PAVE copolymer preferably contains the HFP unit in an amount of 25% by mass or less of all the monomer units. The HFP unit in an amount within the above range can lead to better heat resistance. The amount of the HFP unit is more preferably 20% by mass or less, still more preferably 18% by mass or less, particularly preferably 15% by mass or less, while preferably 0.1% by mass or more, more preferably 1% by mass or more, particularly preferably 2% by mass or more.

The amount of the HFP unit can be measured by $^{19}$F-NMR.

The TFE/HFP/PAVE copolymer contains the PAVE unit in an amount of more preferably 20% by mass or less, still more preferably 10% by mass or less, particularly preferably 3% by mass or less, while preferably 0.1% by mass or more, more preferably 1% by mass or more. The amount of the PAVE unit can be measured by $^{19}$F-NMR.

The FEP may further contain an ethylenic monomer (a) unit.

The ethylenic monomer (a) unit may be any monomer unit copolymerizable with a TFE unit and a HFP unit, and further a PAVE unit in the case of a TFE/HFP/PAVE copolymer. Examples thereof include fluorine-containing ethylenic monomers such as vinyl fluoride (VF), vinylidene fluoride (VdF), and chlorotrifluoroethylene (CTFE) and non-fluorinated ethylenic monomers such as ethylene, propylene, and alkyl vinyl ether.

In the case of a TFE/HFP/PAVE/ethylenic monomer (a) copolymer, the polymer preferably has a mass ratio (TFE/HFP/PAVE/ethylenic monomer (α)) of (70 to 98)/(0.1 to 25)7(0.1 to 25)/(0.1 to 10) (% by mass), more preferably (70 to 98)1(0.1 to 25)/(0.1 to 20)/(0.1 to 5) (% by mass), still more preferably (70 to 98)/(0.1 to 20)/(0.1 to 10)/(0.1 to 3) (% by mass).

The TFE/HFP copolymer contains the polymerized unit(s) other than the TFE unit in a total amount of 1% by mass or more.

The FEP preferably has a melting point of 200° C. to 280° C. The melting point is more preferably 275° C. or lower, still more preferably 270° C. or lower.

The melting point is the temperature corresponding to the maximum value on a heat-of-fusion curve drawn using a differential scanning calorimeter (DSC) at a temperature-increasing rate of 10° C./min.

The FEP can be produced by a conventionally known method, such as a method including mixing monomers to constitute the units of the FEP and an additive such as a polymerization initiator as appropriate and performing emulsion polymerization, solution polymerization, or suspension polymerization.

The PFA and FEP each preferably has a melt flow rate (MFR) of 0.1 to 100 g/10 min, more preferably 0.1 to 50 g/10 min.

The MFR is the mass (g/10 min) of the polymer flowed out of a nozzle having an inner diameter of 2 mm and a length of 8 mm per 10 minutes in conformity with ASTM D1238 at 372° C. and a load of 5 kg.

The PFA and FEP each preferably has an initial pyrolysis temperature (1% mass reduction temperature) of 360° C. or higher. The lower limit is more preferably 370° C. The upper limit of the initial pyrolysis temperature may be 410° C., for example, as long as it falls within the above range.

The initial pyrolysis temperature refers to the temperature at which 1% by mass of the copolymer under a heating test is decomposed. It is obtained by determining the temperature at which 1% by mass of the mass of the copolymer under a heating test is reduced using a thermogravimetric-differential thermal analyzer (TG-DTA).

The non-fluorine resin is a polymer containing a polymerized unit based on a non-fluorine monomer. Preferred examples of the non-fluorine monomer include, but are not limited to, at least one selected from the group consisting of acrylic esters, methacrylic esters, acrylonitrile, vinyl chloride, vinylidene chloride, vinyl acetate, styrene monomers, urethane monomers, and silicone monomers. The non-fluorine resin may be a homopolymer of one of these or a copolymer of two or more thereof. The non-fluorine resin contains substantially no polymerized unit based on a fluorine-containing monomer.

In order to achieve excellent dispersibility of the particle of the invention and excellent dispersibility of the powder formed from the particles of the invention, preferred among these non-fluorine monomers is at least one selected from the group consisting of acrylic esters, methacrylic esters, vinyl chloride, vinyl acetate, styrene monomers, urethane monomers, and silicone monomers. More preferred is at least one selected from the group consisting of acrylic esters, methacrylic esters, and styrene.

The acrylic ester is preferably an alkyl acrylate containing a C1-C10 alkyl group, and more preferably includes at least one alkyl acrylate selected from the group consisting of methyl acrylate, ethyl acrylate, propyl acrylate, isopropyl acrylate, butyl acrylate, 2-ethylhexyl acrylate, cyclohexyl acrylate, and glycidyl acrylate, and still more preferably includes at least one alkyl acrylate selected from the group consisting of butyl acrylate and 2-ethylhexyl acrylate.

The methacrylic ester is preferably an alkyl methacrylate containing a C1-C10 alkyl group, more preferably includes at least one alkyl methacrylate selected from the group consisting of methyl methacrylate, ethyl methacrylate, propyl methacrylate, isopropyl methacrylate, butyl methacrylate, 2-ethylhexyl methacrylate, cyclohexyl methacrylate, and glycidyl methacrylate, and still more preferably includes at least one alkyl methacrylate selected from the group consisting of methyl methacrylate and cyclohexyl methacrylate.

When the non-fluorine resin contains one or both of a polymerized unit based on an acrylic ester and a polymerized unit based on a methacrylic ester, the non-fluorine resin preferably contains the polymerized unit based on an acrylic ester and the polymerized unit based on a methacrylic ester in a total amount of 20 mol % or more of the entire non-fluorine resin. The total amount of the polymerized unit based on an acrylic ester and the polymerized unit based on a methacrylic ester may be 50 mol % or more or 70 mol % or more.

Examples of the styrene monomer include styrene, α-methyl styrene, α-ethyl styrene, α-propyl styrene, and α-butyl styrene.

When the non-fluorine resin contains a polymerized unit based on a styrene monomer, the amount of the polymerized unit based on a styrene monomer is preferably 20 mol % or more of the entire non-fluorine resin. The amount of the polymerized unit based on a styrene monomer may be 50 mol % or more or 70 mol % or more.

Examples of the urethane monomer include an addition reaction product of a (meth)acrylic monomer having a hydroxyl group at the β position and a diisocyanate compound such as toluene diisocyanate or diphenylmethane diisocyanate.

When the non-fluorine resin contains a polymerized unit based on a urethane monomer, the amount of the polymerized unit based on a urethane monomer is preferably 20 mol % or more of the entire non-fluorine resin. The amount of the polymerized unit based on a urethane monomer may be 50 mol % or more or 70 mol % or more.

Examples of the silicone monomer include alkoxysilanes such as methyltrimethoxysilane, dimethyldimethoxysilane, dibutyldimethoxysilane, diisopropyldipropoxysilane, and diphenyldibutoxysilane.

When the non-fluorine resin contains a polymerized unit based on a silicone monomer, the amount of the polymerized unit based on a silicone monomer is preferably 20 mol % or more of the entire non-fluorine resin. The amount of the polymerized unit based on a silicone monomer may be 50 mol % or more or 70 mol % or more.

The particles of the invention preferably have an average particle size of 10 to 500 nm, more preferably 20 to 400 nm.

The average particle size of the particles refers to the value obtained by diluting the particle dispersion by a factor of about 1000 with water and determining the average particle size with FPAR-1000 (available from Otsuka Electronics Co., Ltd., dynamic light scattering).

The cores of the particles of the invention preferably have an average particle size of 5 to 495 nm, more preferably 50 to 400 nm, still more preferably 100 to 300 nm. The average particle size of the cores refers to the average particle size of perfluoropolymer dispersion, which is the value obtained by diluting the perfluoropolymer dispersion by a factor of about 1000 with water and determining the average particle size with FPAR-1000 (available from Otsuka Electronics Co., Ltd., dynamic light scattering).

The shells of the particles of the invention each preferably have a thickness of 1 to 300 nm, more preferably 2 to 200 nm, still more preferably 3 to 150 nm. The thickness of each shell refers to the value obtained by subtracting the average particle size of the perfluoropolymer particles as cores from the average particle size of a dispersion containing the particles of the invention.

In order to achieve much better dispersibility, the particle of the invention preferably has a mass ratio between the core and the shell (core/shell) of 99.9/0.1 to 10/90, more preferably 99/1 to 30/50, still more preferably 95/5 to 80/20.

The particle of the invention preferably has a spherical shape. The expression "spherical" as used herein involves not only a true sphere but also shapes whose cross section has a curved outline such as a circle, an ellipse, a substantial circle, or a substantial ellipse. A spherical particle can be obtained by the production method below.

The particle of the invention preferably has an aspect ratio of 1.4 or less, more preferably 1.2 or less. The aspect ratio refers to the value obtained by dividing the longer diameter of a particle by the shorter diameter thereof. The longer diameter and the shorter diameter can be measured on an image of the particle taken with a transmission electron microscope, for example.

The particle of the invention can be produced by adding a non-fluorine monomer to a perfluoropolymer dispersion and polymerizing the non-fluorine monomer. The polymerization of the non-fluorine monomer causes formation of a shell of the non-fluorine resin.

The perfluoropolymer dispersion can be prepared by a known method.

The perfluoropolymer dispersion preferably contains particles containing a perfluoropolymer and an aqueous medium. The perfluoropolymer in the perfluoropolymer dispersion is the same as the perfluoropolymer constituting the core of the particle of the invention.

The aqueous medium contains water. The aqueous medium may contain a polar organic solvent in addition to water. Examples of the polar organic solvent include nitrogen-containing solvents such as N-methylpyrrolidone (NMP); ketones such as acetone; esters such as ethyl acetate; polar ethers such as diglyme and tetrahydrofuran (THF); and carbonates such as diethylene carbonate. One of these may be used or two or more thereof may be used in mixture.

The perfluoropolymer dispersion preferably contains particles containing a perfluoropolymer in an amount of 1 to 70% by mass, more preferably 10 to 30% by mass, relative to the entire weight.

The perfluoropolymer dispersion preferably contains an emulsifier represented by the following formula (A):

$$R^2(\!-\!O\!-\!(CH_2CH_2O)_mH)_p \qquad (A)$$

(wherein $R^2$ is a linear or branched C5-C50 hydrocarbon group with a valence of p, m is an integer of 5 to 30, and p is an integer of 1 to 3) in an amount of 1 ppm or less relative to the entire weight. The presence of the emulsifier in the perfluoropolymer dispersion tends to cause generation of different particles derived only from a non-fluorine monomer in addition to the core-shell particles of the invention. The perfluoropolymer dispersion more preferably contains substantially no emulsifier.

The hydrocarbon group in the formula (A) is a group containing a carbon atom and a hydrogen atom and optionally contains a carbon-carbon double bond, a carbon-carbon triple bond, a phenylene group, or the like, but contains no metal atoms such as Si.

Examples of the emulsifier represented by the formula (A) include an emulsifier represented by the following formula (A1):

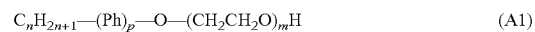

$$C_nH_{2n+1}\!-\!(Ph)_p\!-\!O\!-\!(CH_2CH_2O)_mH \qquad (A1)$$

(wherein n is an integer of 5 to 50, p is 0 or 1, m is an integer of 5 to 30, and Ph is a phenylene group), and an emulsifier represented by the following formula (A2):

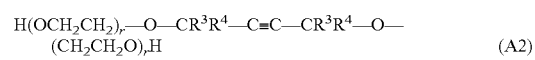

$$H(OCH_2CH_2)_r\!-\!O\!-\!CR^3R^4\!-\!C\!\equiv\!C\!-\!CR^3R^4\!-\!O\!-\!(CH_2CH_2O)_rH \qquad (A2)$$

(wherein $R^3$ and $R^4$ are each a linear or branched C1-C50 hydrocarbon group, and r is an integer of 5 to 30).

In the above formula, $C_nH_{2n+1}\!-\!$ may be linear or branched.

The non-fluorine monomer is preferably polymerized by seed polymerization in which a particle containing a perfluoropolymer is used as a seed particle and a non-fluorine monomer is emulsion polymerized in water. As described, the seed polymerization, which is a kind of emulsion polymerization and in which polymerization is performed using a perfluoropolymer dispersion for a core as a seed and adding a non-fluorine monomer for a shell to the dispersion, can suitably form a particle having a double structure, i.e., a core-shell particle, in which the entire surface of the spherical core particle is coated with a shell polymer while keeping the shape of the spherical core particle.

The non-fluorine monomer(s) is/are preferably added in a total amount of 1.0 to 50 parts by mass, more preferably 5.0 to 20 parts by mass, relative to 100 parts by mass of the particles containing a perfluoropolymer.

The polymerization of the non-fluorine monomer is preferably initiated by adding a polymerization initiator. The polymerization initiator may be added while the non-fluorine monomer is polymerized.

The polymerization initiator used for polymerization of the non-fluorine monomer may be any polymerization initiator usable for free radical reaction in water. The polymerization initiator may be used in combination with a reducing agent in some cases. Examples of a water-soluble polymerization initiator used include persulfates and hydrogen peroxide. Examples of the reducing agent include sodium pyrobisulfite, sodium bisulfite, sodium L-ascorbate, and rongalit. Examples of an oil-soluble polymerization initiator include diisopropyl peroxydicarbonate (IPP), benzoyl peroxide, dibutyl peroxide, and azobisisobutyronitrile (AIBN). The polymerization initiator is preferably used in an amount of 0.05 to 5.0 parts by mass for each 100 parts by mass of the non-fluorine monomer.

In order to produce the core-shell particle of the invention, the production method preferably includes adding a non-fluorine monomer and a polymerization initiator simultaneously to a perfluoropolymer dispersion and initiating polymerization.

In the production method, the non-fluorine monomer may be added to the reaction system collectively, intermittently, or continually. The non-fluorine monomer is preferably added intermittently or continually, more preferably continually.

The production method includes adding a non-fluorine monomer to a perfluoropolymer dispersion and polymerizing the non-fluorine monomer to produce a core-shell particle. The non-fluorine monomer is preferably continually added from the starting of the polymerization, not from the initial stage (before starting of polymerization).

The non-fluorine monomer is preferably polymerized by adding a specific emulsifier in addition to the non-fluorine monomer. In other words, the production method preferably includes adding the non-fluorine monomer and a specific emulsifier to a perfluoropolymer dispersion and polymerizing the non-fluorine monomer. The specific emulsifier may be added to a reaction system collectively at the initial stage, intermittently, or continually.

The specific emulsifier is preferably an emulsifier that tends to preferentially adsorb on the particle surface of a perfluoropolymer dispersion, and a preferred example is an anionic emulsifier having a high effect of giving polymerization stability. A silicone emulsifier is also preferred because it has an SP value (solubility parameter) close to that of a perfluoropolymer dispersion particle and thus increases the miscibility with the particle surface, which expectedly gives an adsorption effect.

Examples of the anionic emulsifier include alkyl sulfonate, alkyl aryl sulfonic acid, alkyl sulfosuccinic acid, a polyoxyethylene aryl sulfate, and an ammonium salt of polyoxyethylene polycyclic phenyl ether sulfate. Preferred among these are alkyl sulfonate, alkyl aryl sulfonic acid, alkylsulfosuccinic acid, and an ammonium salt of a polyoxyethylene polycyclic phenyl ether and an organosulfate. One emulsifier may be used or two or more emulsifiers may be used in combination.

The silicone emulsifier is preferably selected from silicone derivatives containing a polyoxyalkylene group in which a polyether group such as a polyethylene oxide or a polypropylene oxide is introduced into each terminal or a side chain with polyether-modified silicone oil. Such a silicone emulsifier can reduce the surface tension of the particle surface and increase the wettability to particles.

Examples of the polyether-modified silicone include polyether-modified siloxane, polyether-modified dimethyl siloxane, polyether-modified polydimethylsiloxane, polyether-modified polymethylalkylsiloxane, polyester-modified polydimethylsiloxane, polyester-modified polymethylalkylsiloxane, aralkyl-modified polymethylalkylsiloxane, and polyester-modified hydroxyl-group-containing polydimethylsiloxane. In consideration of polymerization stability, preferred is one having a molecular weight of 1000 to 5000 and an HLB (Si) of 7 to 15. One emulsifier may be used or two or more emulsifiers may be used in combination.

Furthermore, an anionic emulsifier and a silicone emulsifier may be used in combination.

Addition of the specific emulsifier can prevent formation of particles (different particles) consisting of the non-fluorine monomer and enables production of a dispersion containing a particle that includes a core containing a perfluoropolymer and a shell containing a non-fluorine resin. The absence of the specific emulsifier may cause formation of the different particles and fail in forming a shell. Use of an emulsifier other than the specific emulsifier may reduce the compatibility with the core containing a perfluoropolymer and cause incomplete polymerization in which the surface of the core particle is partly polymerized.

Specific examples of the emulsifier include anionic emulsifiers such as Newcol 707SF and silicone emulsifiers such as BYK-348, KF-6013, and KF-6204.

The specific emulsifier(s) is/are preferably added in a total amount of 0.1 to 5.0 parts by mass, more preferably 1.0 to 2.0 parts by mass, relative to 100 parts by mass of the particles containing a perfluoropolymer.

In polymerization of the non-fluorine monomer, additives such as a chain transfer agent, a chelating agent, and a pH adjuster may be added in addition to the non-fluorine monomer, the specific emulsifier, and the polymerization initiator.

Examples of the chain transfer agent include halogenated hydrocarbons such as chloroform and carbon tetrachloride; and mercaptans such as n-dodecyl mercaptan, tert-dodecyl mercaptan, and n-octyl mercaptan. The chain transfer agent is preferably used in an amount of 0 to 5.0 parts by mass, more preferably 0.1 to 3.0 parts by mass, for each 100 parts by mass of the non-fluorine monomer.

The polymerization temperature and polymerization duration of the non-fluorine monomer may be appropriately set in accordance with the target non-fluorine resin. For example, the polymerization temperature may be 5° C. to 80° C., and the polymerization duration may be 10 to 300 min.

The dispersion of the invention contains the particles of the invention. Conventionally, primary particles of a perfluoropolymer tend to have poor dispersibility in solvents and poor miscibility with other dispersions. In contrast, the dispersion of the invention, containing the particles of the invention, allows excellent dispersibility in solvents and improved miscibility with other dispersions.

The dispersion of the invention preferably contains the particles of the invention in an amount of 1 to 70% by mass, more preferably 5 to 50% by mass, still more preferably 10 to 30% by mass.

The dispersion of the invention preferably contains an aqueous medium in addition to the particles of the invention. The aqueous medium contains water. The aqueous medium may contain a polar organic solvent in addition to water. Examples of the polar organic solvent include nitrogen-containing solvents such as N-methylpyrrolidone (NMP); ketones such as acetone; esters such as ethyl acetate; polar ethers such as diglyme and tetrahydrofuran (THF); and carbonates such as diethylene carbonate. One of these may be used or two or more thereof may be used in mixture.

The dispersion of the invention preferably contains the emulsifier represented by the formula (A) in an amount of 1 ppm or less, more preferably 0.1 ppm or less. Still more preferably, the dispersion of the invention contains substantially no emulsifier.

The amount of the emulsifier can be determined by ion chromatography.

The dispersion of the invention preferably contains particles consisting only of a non-fluorine resin in an amount of 1% or less, more preferably 0.1% or less. The dispersion of the invention still more preferably contains substantially no particles consisting only of a non-fluorine resin.

The amount of the particles consisting only of a non-fluorine resin can be determined with a transmission electron microscope by taking a STEM image (representing the total amount of the non-fluorine resin and the perfluoropolymer) and an EDS mapping of fluorine (representing the perfluoropolymer only) and comparing the area proportion occupied by both of the non-fluorine resin and the perfluoropolymer with the area proportion occupied by the perfluoropolymer only.

The dispersion of the invention may contain components such as a water soluble polymer (e.g., polyvinyl alcohol), an organic solvent, and various additives in addition to the particles of the invention and the aqueous medium.

The dispersion of the invention can be obtained by the method for producing the particle of the invention. Specifically, the dispersion of the invention can be produced by a production method including adding a non-fluorine monomer to a perfluoropolymer dispersion and polymerizing the non-fluorine monomer.

The dispersion of the invention may be used in combination with a dispersion containing a different polymer other than the particle of the invention. The dispersion of the invention, containing the particles of the invention, allows excellent dispersibility in and miscibility with a dispersion containing a different polymer, and thus can provide a dispersion with the particles of the invention and the different polymer being uniformly mixed.

As described, a liquid composition containing the particles of the invention and a different polymer is also an aspect of the invention. The liquid composition preferably contains a liquid medium such as water or an organic solvent.

Examples of the different polymer include, but are not limited to, epoxy resin, silicone resin, and polyimide.

In the case of preparing such a mixed dispersion, the ratio between the particles of the invention and the different polymer may be appropriately set according to the application. For example, the mass ratio (particles of the invention/different polymer) may be 10/90 to 90/10.

The powder of the invention contains the particles of the invention. The powder of the invention contains secondary particles which are aggregates of the particles of the invention. Conventionally, secondary particles of a perfluoropolymer tend to have poor dispersibility in and miscibility with solvents and other resins. In contrast, the powder of the invention, formed from the particles of the invention, achieves significantly improved dispersibility in and miscibility with solvents and other resins.

The average particle size of the powder of the invention may be appropriately set according to the intended use thereof, for example, and is preferably 1 to 1000 μm, more preferably 3 to 500 μm, for example.

The average particle size is determined by measurement using a laser diffraction particle size distribution analyzer (HELOS & RODOS) available from JEOL Ltd. at a dispersion pressure of 1.0 bar without cascade impaction and taking the particle size corresponding to 50% of the cumulative volume in the particle size distribution as the average particle size.

The powder of the invention preferably contains the emulsifier represented by the formula (A) in an amount of 1 ppm or less, more preferably 0.1 ppm or less. Still more preferably, the powder of the invention contains substantially no emulsifier.

The amount of the emulsifier can be determined by ion chromatography.

The powder of the invention preferably contains spherical particles. Spherical particles can achieve much better dispersibility with other materials. Whether the particles have spherical shapes or not can be confirmed by observing the particles with a scanning electron microscope or a video microscope.

The powder of the invention can be obtained by coagulating a dispersion containing the particles of the invention and separating, recovering, and drying the coagulated matter, for example.

Alternatively, the powder of the invention can be obtained by spray drying a dispersion containing the particles of the invention. Spray drying enables easy production of spherical secondary particles, and a powder obtained by such a method has much better dispersibility. The spray drying is preferably performed under the conditions of a disk rotation speed of 8000 to 12000 rpm, a stock solution supply speed of 1 to 4 Kg/h, an inlet temperature of 100° C. to 150° C., and an outlet temperature of 50° C. to 80° C.

The powder of the invention, having excellent dispersibility in and miscibility with other materials, can be suitably used as an additive to polymers such as resin and rubber. Use of the powder of the invention as an additive can efficiently impart the original properties of a perfluoropolymer, such as excellent slidability, non-stickiness, and low dielectricity. A composition containing the powder and a polymer other than a perfluoropolymer is also an aspect of the invention.

An example of the polymer other than a perfluoropolymer is, but not limited to, a thermoplastic resin. Examples of the thermoplastic resin include polyolefin-based resins (e.g., polyethylene-based resins, polypropylene-based resins, polymethylpenten-based resins), polyvinyl chloride-based resins, polystyrene-based resins (e.g., polystyrene, AS, ABS), polycarbonate (PC)-based resins (e.g., PC, PC-based alloy resins such as PC/ABS), polyamide-based resins (e.g., nylon, semi-aromatic polyamide), polyester-based resins (e.g., polybutylene terephthalate, polyethylene terephthalate), acrylic resins (e.g., polymethyl methacrylate, polyacrylonitrile), polyacetal, polyether ether ketone, modified polyphenylene ether, polyarylene sulfide resins, polysulfone resins, polyvinylidene fluoride resins, and various polymer alloys.

The polymer other than a perfluoropolymer is preferably a non-fluorine resin. In the case of combination use with a non-fluorine resin, the excellent dispersibility of the powder of the invention is much more improved.

The polymer other than a perfluoropolymer preferably includes at least one resin selected from the group consisting of polyvinyl chloride-based resins, polyolefin-based resins (especially, polyethylene-based resins and polypropylene-based resins), nylon-based resins, polyester-based resins, and polycarbonate-based resins, more preferably at least one resin selected from the group consisting of polycarbonate-based resins and nylon-based resins, particularly preferably a polycarbonate-based resin.

The composition preferably contains the powder in an amount of 0.01 to 10 parts by mass, more preferably 0.03 to 2 parts by mass, still more preferably 0.1 to 0.5 parts by mass, relative to 100 parts by mass of the polymer other than a perfluoropolymer.

The powder of the invention may be added to a medium such as water or an organic solvent and thereby used as a dispersion containing the powder.

The particle of the invention, the dispersion containing the particles of the invention, and the powder containing the particles of the invention can be used in various applications. The powder containing the particles of the invention can be used as a dripping inhibitor, an additive for coating material, a slidability-imparting agent, a low-dielectricity-imparting agent, a water- and oil-repellent agent, a release agent, an anti-fluttering agent, or a melt tension regulator, for example.

EXAMPLES

The invention is described with reference to examples, but the examples are not intended to limit the invention.

The following are details of the compounding agents mentioned in the examples, comparative examples, and tables.

(Perfluoropolymer Aqueous Dispersion)

Low molecular weight PTFE aqueous dispersion: average primary particle size 209 nm, solid concentration 29.0%, melt viscosity $3 \times 10^4$ Pa·s High molecular weight PTFE aqueous dispersion: average primary particle size 244 nm, solid concentration 27.4%, SSG 2.17

PFA aqueous dispersion: aqueous dispersion of TFE/PPVE copolymer, TFE/PPVE=97/3 (wt %), average particle size 297 nm, solid concentration 15.2%

(Emulsifier)

Newcol 707SF (anionic emulsifier, available from Nippon Nyukazai Co., Ltd.): ammonium salt of polyoxyethylene polycyclic phenyl ether sulfate, active constituents 28%

KF-6204 (silicone emulsifier, available from Shin-Etsu Chemical Co., Ltd.), polyether-modified silicone, active constituents 100%, molecular weight 1600, HLB(Si) 11

Latemul E-118B (anionic emulsifier, available from KAO Corp.), sodium polyoxyethylene alkyl ether sulfate: 26%

Neopelex G-15 (anionic emulsifier, available from KAO Corp.), sodium dodecylbenzene sulfonate: 20%

Latemul ASK (anionic emulsifier, available from KAO Corp.), dipotassium alkenyl succinate: 28%

OS soap (anionic emulsifier, available from KAO Corp.), fatty acid potassium: 16%

(Polymerization Initiator)

Ammonium persulfate (available from ADEKA Corp.)

Potassium persulfate (available from ADEKA Corp.)

Ferrous sulfate (available from Wako Pure Chemical Corporation)

L-ascorbic acid (available from Fuso Chemical Co., Ltd.)

Perbutyl H-69 (available from NOF Corporation), t-butyl hydroperoxide concentration 69%

(Chain Transfer Agent)

Thiokalcol 20 (available from KAO Corp.), n-dodecyl mercaptan

The evaluations described in the examples and comparative examples were performed as follows.

(1) Evaporation Residue Content

A 1-g portion of the resulting dispersion was weighed on an aluminum plate and dried at 105° C. for one hour. The evaporation residue was weighed and the evaporation residue content was calculated.

(2) PH

The resulting dispersion was controlled to have a liquid temperature of 25° C. and the PH of the dispersion was measured with a PH meter.

(3) Viscosity

The resulting dispersion was controlled to have a liquid temperature of 25° C. and the viscosity of the dispersion was measured with a B-type rotational viscometer (6 rpm, No. 1 rotor).

(4) Average Particle Size of Dispersion (Primary Particles)

The resulting dispersion was diluted and dispersed by a factor of 1000 with water, and the average particle size of the particles was determined with FPAR-1000 (available from Otsuka Electronics Co., Ltd., dynamic light scattering).

(5) Shell Thickness

The thickness of the shell was determined as the half of the value obtained by subtracting the average particle size of PTFE particles corresponding to cores from the average particle size of the dispersion (primary particles) determined in (4).

The average particle sizes were each determined by diluting and dispersing the dispersion by a factor of 1000 with water and determining the average particle size with FPAR-1000 (available from Otsuka Electronics Co., Ltd., dynamic light scattering).

(6) Average Particle Size and Shape of Powder (Secondary Particles)

The average particle size was determined by measurement using a laser diffraction particle size distribution analyzer (HELOS & RODOS) available from JEOL Ltd. at a dispersion pressure of 1.0 bar without cascade impaction and taking the particle size corresponding to 50% of the cumulative volume in the particle size distribution as the average particle size.

(7) Determination of Core-Shell Particles and Shell Coverage

First, 1 part by weight of the dispersion containing particles (primary particles) was diluted with 1000 parts by weight of pure water. The diluted dispersion was sprayed to a filmed sheet mesh for transmission electron microscopic observation and then dried, which allowed the particles for shell thickness measurement to attach to the sheet mesh. In order to prevent charge up, the sheet mesh was coated with osmium having a thickness of about 5 nm at a vacuum of 2 Pa for 10 seconds using an osmium coater (Neoc-Pro Neo osmium coater available from Meiwafosis Co., Ltd.). This sheet mesh sample was subjected to STEM observation of the particles using a scanning transmission electron microscope (Talos F200X available from FEI Company Japan Ltd.) at an observation magnification of 225000 times or 320000 times and an image size of 1024×1024 pixels. Scanning was performed 18 times for 189 seconds at an acceleration voltage of 200 kV. Simultaneously with the STEM observation, element mapping was performed by scanning 9 times for 189 seconds with an energy dispersive X-ray detector (Super-X available from FEI Company Japan Ltd.). The obtained element mapping images of carbon and fluorine were superimposed with each other. An image in which only the carbon atoms circumferentially present on the periphery of the particle containing fluorine are mapped was prepared with image analyzing software (ESPRIT 1,9 available from Bruker BioSpin GmbH), and whether the particles were core-shell particles or not was determined.

At the same time, the shell coverage was determined. The shell coverage was determined as follows. Using image analyzing software, the superimposed images were binarized and separated into a core particle portion containing fluorine and a carbon portion circumferentially present on the periphery of the core particle portion. Then, the length of the periphery of the core particle portion containing fluorine was determined by selecting 50 or more points and measuring the lengths therebetween by section length measurement in a manual manner. The coverage Z (%) was calculated by the following formula:

$$Z=(Y/(X+Y))\times 100$$

wherein X represents the length (nm) of a part where the inner periphery of the particle containing fluorine and the outer periphery of the particle containing carbon were not superimposed (a part where the core particle was not coated with the shell) and Y represents the length (nm) of a part where the periphery of the particle containing fluorine and the periphery of the particle containing carbon were superimposed with each other (a part where the core particle was coated with the shell).

(8) Amount of Different Particles Generated

The amount C (%) of different particles generated was calculated from the following formula using the STEM image (black part represents the total of the non-fluorine resin and the perfluoropolymer and this area is referred to as A) and the element mapping image of fluorine (representing the perfluoropolymer only and this area is referred to as B) used in the core-shell particle observation.

$$C=(A-B)/A\times 100$$

(9) Dispersibility of Powder (Secondary Particles)

A labo plast mill mixer (100C100 available from Toyo Seiki Co., Ltd.) having an inner capacity of 60 ml was charged with 40.5 g of polyethylene pellets (Novatec LD LC500 available from Japan Polyethylene Corporation) and 4.5 g of powder containing core-shell particles (the weight ratio between polyethylene and powder was 90:10 (%)). The mixture was kneaded for 10 minutes with the blade being turned at 100 rpm at 160° C. The kneaded product was pre-heated at 180° C. for 15 minutes and compression-molded at a pressure of 2 MPa using a heat press, whereby a 1-mm-thick press sheet was obtained. This sheet was punched to provide five specimens for a tensile test, each having an ASTM D638 V dumbbell shape. Each specimen was evaluated through a tensile test in accordance with ASTM D638 using an autograph (AGS-J 5kN available from Shimadzu Corporation). The tensile strength and the elongation were each determined by averaging the values of the five specimens. Simple polyethylene (without powder) had a tensile strength of 14.9 MPa and an elongation value of 694%. The tensile strength and elongation value of the powder-added composition were determined, and the reduction percentages from those of the simple polyethylene were calculated. A powder having a higher dispersibility has smaller reduction percentages.

Example 1

A reactor provided with tools such as a stirrer, a nitrogen inlet tube, and a thermometer was charged with 52 parts by mass of the low molecular weight PTFE aqueous dispersion and 0.5 parts by mass of Newcol 707SF, and the components were stirred for 30 minutes. The reactor was then purged with nitrogen and the temperature was increased. After the inner temperature reached 75° C., 15 parts by mass of methyl methacrylate as an acrylic monomer and a liquid in which 0.02 parts by mass of ammonium persulfate as a catalyst was dissolved in 3.0 parts by mass of water were simultaneously added dropwise. After four-hour reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Figure 1:
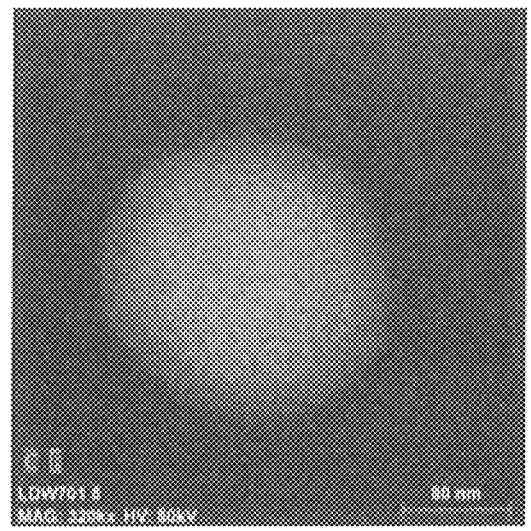
FIG. 1 is an image in which an image of a core-shell particle in a dispersion obtained in Example 1 taken with a scanning transmission electron microscope is superimposed with element mapping images of carbon and fluorine.

FIG. 1 is an image in which an image of a core-shell particle in the dispersion obtained in Example 1 taken with a scanning transmission electron microscope is superimposed with element mapping images of carbon and fluorine. The figure demonstrates that the resulting core-shell particle had a structure in which the entire surface of the low molecular weight PTFE particle was completely coated with polymethyl methacrylate.

Example 2

A reactor provided with tools such as a stirrer, a nitrogen inlet tube, and a thermometer was charged with 84 parts by mass of the low molecular weight PTFE aqueous dispersion and 1.0 part by mass of Newcol 707SF, and the components were stirred for 30 minutes. The reactor was then purged with nitrogen and the temperature was increased. After the inner temperature reached 75° C., 6 parts by mass of methyl methacrylate as an acrylic monomer and a liquid in which 0.01 parts by mass of ammonium persulfate as a catalyst was dissolved in 1.8 parts by mass of water were simultaneously added dropwise. After one-hour reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 3

A reactor provided with tools such as a stirrer, a nitrogen inlet tube, and a thermometer was charged with 84 parts by mass of the low molecular weight PTFE aqueous dispersion and 0.5 parts by mass of KF-6204, and the components were stirred for 30 minutes. The reactor was then purged with nitrogen and the temperature was increased. After the inner temperature reached 75° C., 6 parts by mass of methyl methacrylate as an acrylic monomer and a liquid in which 0.01 parts by mass of ammonium persulfate as a catalyst was dissolved in 1.8 parts by mass of water were simultaneously added dropwise. After one-hour reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 4

A reactor provided with tools such as a stirrer, a nitrogen inlet tube, and a thermometer was charged with 89 parts by mass of the high molecular weight PTFE aqueous dispersion and 1.5 parts by mass of Newcol 707SF, and the components were stirred for 30 minutes. The reactor was then purged with nitrogen and the temperature was increased. After the inner temperature reached 75° C., 6 parts by mass of methyl methacrylate as an acrylic monomer and a liquid in which 0.01 parts by mass of ammonium persulfate as a catalyst was dissolved in 1.1 parts by mass of water were simultaneously added dropwise. After one-hour reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 5

A reactor provided with tools such as a stirrer, a nitrogen inlet tube, and a thermometer was charged with 93 parts by mass of the high molecular weight PTFE aqueous dispersion and 1.5 parts by mass of Newcol 707SF, and the components were stirred for 30 minutes. The reactor was then purged with nitrogen and the temperature was increased. After the inner temperature reached 75° C., 1.5 parts by mass of methyl methacrylate as an acrylic monomer and a liquid in which 0.004 parts by mass of ammonium persulfate as a catalyst was dissolved in 1.2 parts by mass of water were simultaneously added dropwise. After 30-minute reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 6

A reactor provided with tools such as a stirrer, a nitrogen inlet tube, and a thermometer was charged with 95 parts by mass of the high molecular weight PTFE aqueous dispersion and 1.5 parts by mass of Newcol 707SF, and the components were stirred for 30 minutes. The reactor was then purged with nitrogen and the temperature was increased. After the inner temperature reached 75° C., 0.3 parts by mass of methyl methacrylate as an acrylic monomer and a liquid in which 0.004 parts by mass of ammonium persulfate as a catalyst was dissolved in 1.4 parts by mass of water were simultaneously added dropwise. After 30-minute reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 7

A reactor provided with tools such as a stirrer, a nitrogen inlet tube, and a thermometer was charged with 93 parts by mass of the high molecular weight PTFE aqueous dispersion and 1.5 parts by mass of Newcol 707SF, and the components were stirred for 30 minutes. The reactor was then purged with nitrogen and the temperature was increased. After the inner temperature reached 75° C., 1.5 parts by mass of styrene as an acrylic monomer and a liquid in which 0.004 parts by mass of ammonium persulfate as a catalyst was dissolved in 1.2 parts by mass of water were simultaneously added dropwise. After 30-minute reaction under stirring at 75° C. and two-hour aging at 80° C., the reaction product was cooled to room temperature, whereby a dispersion was obtained. The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Example 8

A reactor provided with tools such as a stirrer, a nitrogen inlet tube, and a thermometer was charged with 93 parts by mass of the PFA aqueous dispersion and 0.8 parts by mass of Newcol 707SF, and the components were stirred for 30 minutes. The reactor was then purged with nitrogen and the temperature was increased. After the inner temperature reached 75° C., 4 parts by mass of methyl methacrylate as an acrylic monomer and a liquid in which 0.005 parts by mass of ammonium persulfate as a catalyst was dissolved in 2.4 parts by mass of water were simultaneously added dropwise. After one-hour reaction under stirring at 75° C. and two-hour aging at 80° C., the reaction product was cooled to room temperature, whereby a dispersion was obtained.

The dispersions prepared in Examples 1 to 8 were each controlled to have an evaporation residue content of 20 to 30% in the formulation. Table 1 shows the evaporation residue content, PH, viscosity, average particle size, shell thickness, shell coverage, and generation amount of different particles of each resulting dispersion.

TABLE 1

| Materials fed (parts by mass) | Example | | | | | | | |
|---|---|---|---|---|---|---|---|---|
| | 1 | 2 | 3 | 4 | 5 | 6 | 7 | 8 |
| Low molecular weight PTFE aqueous dispersion | 52 | 84 | 84 | | | | | |
| High molecular weight PTFE aqueous dispersion | | | | 89 | 93 | 95 | 93 | |
| PFA aqueous dispersion | | | | | | | | 93 |
| Methyl methacrylate | 15 | 6 | 6 | 6 | 1.5 | 0.3 | | 4 |
| Styrene | | | | | | | 1.5 | |
| Newcol 707SF | 0.5 | 1.0 | | 1.5 | 1.5 | 1.5 | 1.5 | 0.8 |
| KF-6204 | | | 0.5 | | | | | |

TABLE 1-continued

| Materials fed (parts by mass) | Example | | | | | | | |
|---|---|---|---|---|---|---|---|---|
| | 1 | 2 | 3 | 4 | 5 | 6 | 7 | 8 |
| Ammonium persulfate | 0.02 | 0.01 | 0.01 | 0.01 | 0.004 | 0.004 | 0.004 | 0.005 |
| Water | 32.5 | 9 | 9.5 | 3.5 | 4 | 3.2 | 4 | 2.4 |
| Evaporation residue content (%) | 29.7 | 29.7 | 29 | 30.2 | 27.5 | 27.8 | 28.4 | 19.7 |
| PH | 3.1 | 3.4 | 3.9 | 4.9 | 4.7 | 4.9 | 4.7 | 4.3 |
| Viscosity (mPa · s) | 2 | 3 | 3 | 5 | 5 | 10 | 5 | 10 |
| Average particle size (nm) | 331 | 281 | 277 | 306 | 256 | 249 | 258 | 337 |
| Shell thickness (nm) | 61 | 36 | 34 | 31 | 6 | 3 | 7 | 20 |
| Shel coverage (%) | 100 | 100 | 100 | 100 | 100 | 100 | 100 | 100 |
| Amount of different particles generated (%) | 0 | 0 | 0 | 0 | 0 | 0 | 0 | 0 |

Dispersions of Comparative Examples 1 to 3 were prepared with reference to the examples of a prior patent of a third party company. Table 2 shows the properties of the resulting dispersions, such as the evaporation residue and average particle size.

Comparative Example 1

A reactor provided with tools such as a stirrer, a nitrogen inlet tube, and a thermometer was charged with a liquid mixture containing 40.7 parts by mass of water, 45.4 parts by mass of the low molecular weight PTFE aqueous dispersion, 0.25 parts by mass of Latemul ASK, and 10 parts by mass of methyl methacrylate and 2.5 parts by mass of butyl acrylate as acrylic monomers, and the components were stirred for 30 minutes. The reactor was then purged with nitrogen and the temperature was increased. After the inner temperature reached 60° C., a liquid in which 0.025 parts by mass of potassium persulfate as a catalyst was dissolved in 1.25 parts by mass of water was added dropwise over 60 minutes. After two-hour reaction under stirring at 60° C., the reaction product was cooled to room temperature, whereby a dispersion was obtained.

The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

Comparative Example 2

A reactor provided with tools such as a stirrer, a nitrogen inlet tube, and a thermometer was charged with a liquid mixture containing 36.3 parts by mass of water, 51.0 parts by mass of the high molecular weight PTFE aqueous dispersion, and 0.25 parts by mass of Latemul ASK and 9.0 parts by mass of methyl methacrylate and 2.3 parts by mass of butyl acrylate as acrylic monomers, and the components were stirred for 30 minutes. The reactor was then purged with nitrogen and the temperature was increased. After the inner temperature reached 60° C., a liquid in which 0.025 parts by mass of potassium persulfate as a catalyst was dissolved in 1.25 parts by mass of water was added dropwise over 60 minutes. After two-hour reaction under stirring at 60° C., the reaction product was cooled to room temperature, whereby a dispersion was obtained.

The resulting dispersion was treated with an L-8 type spray dryer (available from Ohkawara Kakohki. Co., Ltd.) at a disk rotation speed of 10000 rpm, a stock solution supply speed of 4 Kg/h, an inlet temperature of 135° C., and an outlet temperature of 80° C., whereby a powder was obtained.

Figure 2:
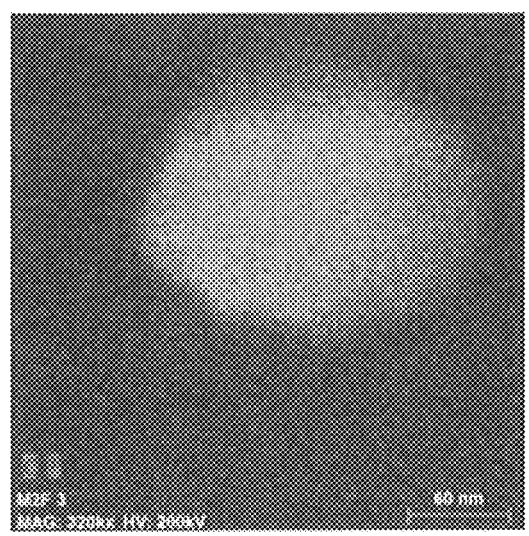
FIG. 2 is an image in which an image of a core-shell particle in a dispersion obtained in Comparative Example 2 taken with a scanning transmission electron microscope is superimposed with element mapping images of carbon and fluorine.

FIG. 2 is an image in which an image of a particle in the dispersion obtained in Comparative Example 2 taken with a scanning transmission electron microscope is superimposed with element mapping images of carbon and fluorine. The figure demonstrates that the resulting core-shell particle had a structure in which the surface of the high molecular weight PTFE particle was not completely but only partly coated with acrylic resin.

Comparative Example 3

A reactor provided with tools such as a stirrer, a nitrogen inlet tube, and a thermometer was charged with 33.9 parts by mass of water, 43.6 parts by mass of the high molecular weight PTFE aqueous dispersion, and 1.1 parts by mass of OS soap, and the components were stirred for 30 minutes. The reactor was then purged with nitrogen and the temperature was increased. Then, an emulsifying container was charged with a liquid mixture (hereinafter, referred to as monomer liquid mixture) containing 8.2 parts by mass of styrene, 3.5 parts by mass of acrylonitrile, and 0.05 parts by mass of Thiokalcol 20.

After the inner temperature reached 60° C., 15% by mass of the monomer liquid mixture was added to the reacter, followed by addition of 0.22 parts by mass of Perbutyl H-69, 0.005 parts by mass of L-ascorbic acid, and 0.0003 parts of ferrous sulfate and aging for 30 minutes. Then, a liquid in which the rest 85% of the monomer liquid mixture and 0.03 parts by mass of L-ascorbic acid were dissolved in 9.4 parts by mass of water was added dropwise over 60 minutes. After two-hour reaction under stirring at 60° C., the reaction product was cooled to room temperature, whereby a dispersion was obtained.

The resulting dispersion was treated with an L-8 type spray dryer (available from Ohkawara Kakohki Co., Ltd.) at a disk rotation speed of 10000 rpm, a stock solution supply speed of 4 Kg/h, an inlet temperature of 135° C., and an outlet temperature of 80° C., whereby a powder was obtained.

FIG. 3 is an image in which an image of a particle in the dispersion obtained in Comparative Example 3 taken with a scanning transmission electron microscope is superimposed with element mapping images of carbon and fluorine. The figure demonstrates that the resulting core-shell particle had a structure in which the surface of the high molecular weight PTFE particle was not completely but only partly coated with a styrene/acrylonitrile copolymer.

TABLE 2

| Materials fed (parts by mass) | Comparative Example | | |
|---|---|---|---|
| | 1 | 2 | 3 |
| Low molecular weight PTFE aqueous dispersion | 45.4 | | |
| High molecular weight PTFE aqueous dispersion | | 51.0 | 43.6 |
| Methyl methaetylate | 10 | 9.0 | |
| Butyl acrylate | 2.5 | 2.3 | |
| Styrene | | | 8.2 |
| Acrylonitrile | | | 3.5 |
| Thiokalcol 20 | | | 0.05 |
| Latemul E-118B | | | |
| Neopelex G-15 | | | |
| Latemul ASK | 0.25 | 0.25 | |
| OS soap | | | 1.1 |
| Ammonium persulfate | | | |
| Potassium persulfate | 0.025 | 0.025 | |
| L-ascorbic acid | | | 0.035 |
| Ferrous sulfate | | | 0.0003 |
| Perbutyl H-69 | | | 0.22 |
| Water | 41.9 | 37.5 | 43.1 |
| Evaporation residue content (%) | 24.3 | 18.3 | 21.8 |
| PH | 6.7 | 6.4 | 8.2 |
| Viscosity (mPa•s) | 5 | 5 | 5 |
| Average particle size (nm) | 294 | 248 | 294 |
| Shell thickness (nm) | 43 | 2 | 50 |
| Shel coverage (%) | 78 | 29 | 42 |
| Amount of different particles generated (%) | 2 | 5 | 68 |

Tables 3 and 4 show the particle size and the dispersibility (tensile strength and elongation reduction percentage) in polyethylene of each perfluoropolymer powder (secondary particles) obtained in the examples and comparative examples. A powder obtained from The high molecular weight PTFE aqueous dispersion without shells had a tensile strength reduction percentage of 43% and an elongation reduction percentage of 65%. Each perfluoropolymer powder of Examples 1 to 7, having a shell coverage of as high as 100%, had a low tensile strength reduction percentage of 9 to 14% and a low elongation reduction percentage of 20 to 25%, while each perfluoropolymer powder of Comparative Examples 1 to 3, having a shell coverage of as low as 29 to 78%, had a high tensile strength reduction percentage of 35 to 42% and a high elongation reduction percentage of 51 to 64%. This indicates that powders containing the core-shell particles of Examples 1 to 7 have good dispersibility in polyethylene.

TABLE 3

| Powder (secondary particles) | Example | | | | | | |
|---|---|---|---|---|---|---|---|
| | 1 | 2 | 3 | 4 | 5 | 6 | 7 |
| Particle size (μm) | 14.4 | 14.8 | 13.4 | 12.4 | 17.3 | 15.8 | 16.6 |
| Tensile strength reduction percentage (%) | 10 | 9 | 12 | 14 | 10 | 9 | 11 |
| Elongation reduction percentage (%) | 20 | 25 | 22 | 21 | 20 | 24 | 23 |

TABLE 4

| Powder (secondary particles) | Comparative Example | | |
|---|---|---|---|
| | 1 | 2 | 3 |
| Particle size (μm) | 12.3 | 11.5 | 12.2 |
| Tensile strength reduction percentage | 35 | 41 | 42 |
| Elongation reduction percentage (%) | 51 | 58 | 64 |

The invention claimed is:

1. A method for producing a core-shell particle, comprising adding a non-fluorine monomer to a perfluoropolymer dispersion and polymerizing the non-fluorine monomer to produce the core-shell particle, the polymerization being initiated by simultaneously adding the non-fluorine monomer and a polymerization initiator to the perfluoropolymer dispersion, wherein the core-shell particle comprises a core containing the perfluoropolymer and a shell containing a non-fluorine resin, the core having a periphery coated with the non-fluorine resin at a coverage of 90% or more, the perfluoropolymer is a polymer containing a polymerized unit based on a perfluoro monomer in an amount of 90 mol % or more relative to all polymerized units, the shell has a mass of 20 or less and the core has a mass of 80 or more relative to a total mass of the core and the shell of 100, the core has an average particle size of 50 nm or more, and the shell has a thickness of 1 to 300 nm.

2. The method according to claim 1, wherein the perfluoropolymer is polytetrafluoroethylene, a tetrafluoroethylene/perfluoro(alkyl vinyl ether) copolymer, or a tetrafluoroethylene/hexafluoropropylene copolymer.

3. The method according to claim 1, wherein the non-fluorine resin is a polymer containing a polymerized unit based on a non-fluorine monomer, and the non-fluorine monomer includes at least one selected from the group consisting of an acrylic ester, a methacrylic ester, acrylonitrile, vinyl chloride, vinylidene chloride, vinyl acetate, a styrene monomer, a urethane monomer, and a silicone monomer.

4. The method according to claim 1, wherein the core and the shell give a mass ratio (core/shell) of 99.9/0.1 to 80/20.

5. The method according to claim 2, wherein the polytetrafluoroethylene has a standard specific gravity of 2.13 to 2.30.

* * * * *